(No Model.) 2 Sheets—Sheet 1.

G. E. SPARE.
BUCKBOARD WAGON.

No. 422,649. Patented Mar. 4, 1890.

Witnesses George E. Spare
Inventor
By Attys
Earle & Seymour (No Model.)   2 Sheets—Sheet 2.

G. E. SPARE.
BUCKBOARD WAGON.

No. 422,649.   Patented Mar. 4, 1890.

United States Patent Office.

GEORGE E. SPARE, OF NEW HAVEN, CONNECTICUT, ASSIGNOR TO THE NEW HAVEN CARRIAGE COMPANY, OF SAME PLACE.

BUCKBOARD WAGON.

SPECIFICATION forming part of Letters Patent No. 422,649, dated March 4, 1890.

Application filed September 23, 1889. Serial No. 324,755. (No model.)

*To all whom it may concern:*

Be it known that I, GEORGE E. SPARE, of New Haven, in the county of New Haven and State of Connecticut, have invented a new Improvement in Buckboard Wagons; and I do hereby declare the following, when taken in connection with accompanying drawings and the letters of reference marked thereon, to be a full, clear, and exact description of the same, and which said drawings constitute part of this specification, and represent, in—

Figure 1:
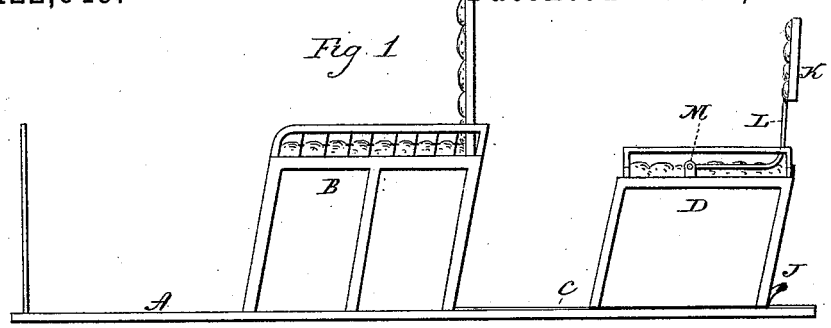
Figure 2:
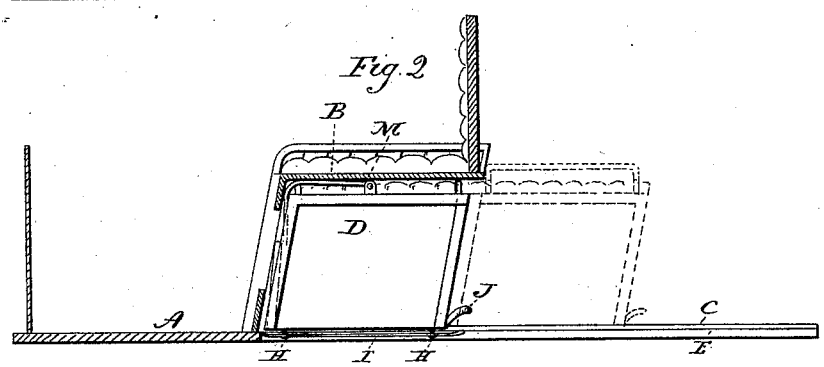
Figures 3, 4:
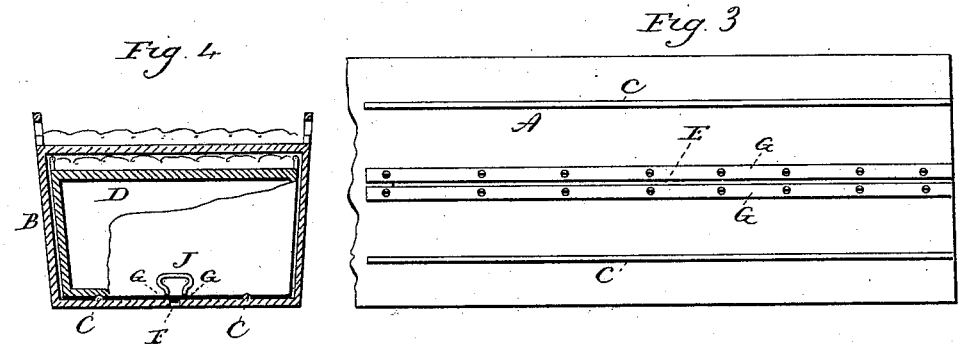
Figures 5, 6:
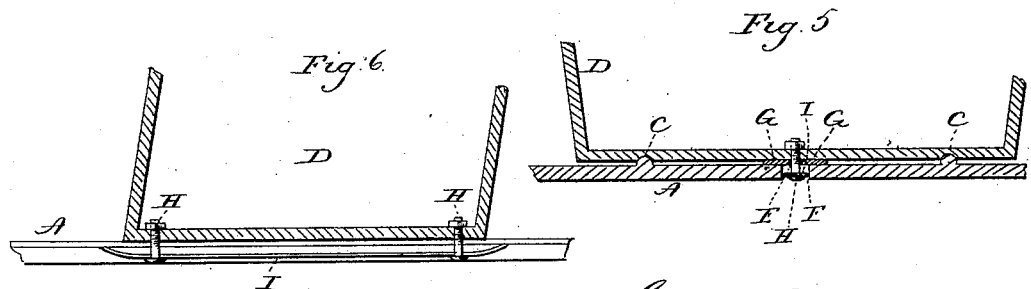
Figure 7:
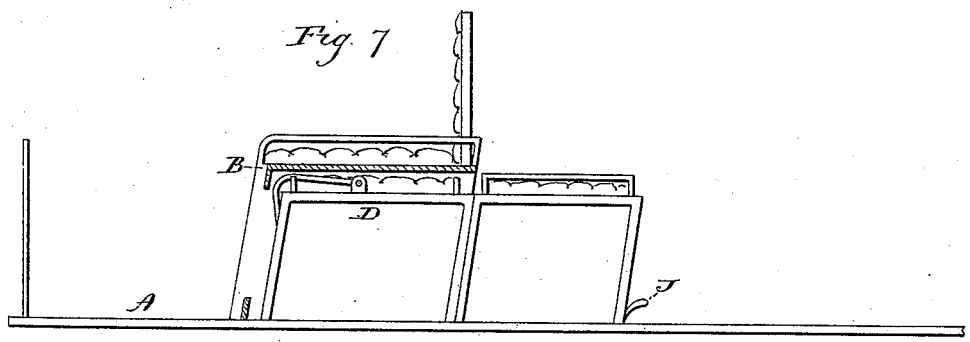
Figure 8:
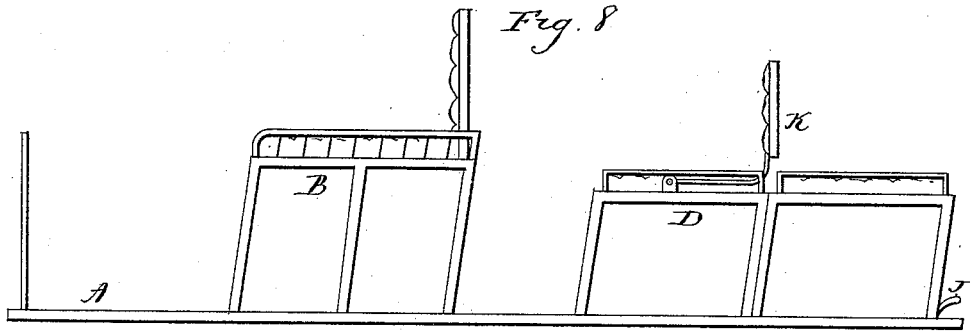

Figure 1, a side view of the wagon with the movable seat in its rear position; Fig. 2, a vertical section representing the movable seat in the chamber beneath the stationary seat, broken lines indicating the movable seat as in position for the rear-facing seat; Fig. 3, a top view of a portion of the body, representing the guides and slot; Fig. 4, a transverse section through the stationary seat, representing the movable seat as in the said chamber, showing partial rear view of said movable seat; Fig. 5, a transverse section illustrating the connection of the seat through the slot in the body, enlarged; Fig. 6, a longitudinal section centrally through the slot, showing the same connection as Fig. 5; Figs. 7 and 8, longitudinal sections representing a modified form of seat.

This invention relates to an improvement in the construction of that class of wagons in which the body consists of an elastic board supported fore and aft, the seat or seats being between the supports, and whereby the elasticity of the board or body is utilized as the carriage-springs, commonly called "buckboards," and particularly to those wagons of this class which are convertible from a single seat to two or more seats. Under the more general construction of this class of wagons the main or single seat is supported upon the body in such manner that it may be thrown rearward, a seat being provided beneath the principal seat, which may then serve as the forward or second seat, the principal seat becoming the back seat.

The object of my invention is to arrange the front or principal seat as a permanent seat on the body and provide a second seat which when not required for use may be set beneath the principal seat, to be withdrawn as occasion may require; and the invention consists in the construction as hereinafter described, and particularly recited in the claims.

A represents the body or board of the wagon, the running-gear or supports for the board not shown, they being of common construction, and the board arranged upon the running-gear in the usual manner.

B represents the principal seat, which is in the form of a box, permanently secured to the body. This seat-box is open at the rear, and so as to form a chamber beneath the principal seat, as seen in Fig. 2. On the top of the body longitudinal parallel tracks or guides C are arranged, on which the second seat D may be set, and so as to slide thereon longitudinally backward and forward. The seat D is of a similar box-like shape to that of the principal seat B, but of a size and shape to pass from the rear into the chamber beneath the seat B, and, as seen in Figs. 2 and 4, the rear of the seat D substantially closing the rear of the chamber under the seat B, as seen in Fig. 2.

To support the movable or second seat D on the body and prevent its accidental detachment, a longitudinal slot E is formed in the body, preferably between and parallel with the tracks C C. This slot is best made by constructing the board with a longitudinal slot F, wider than the slot E, then placing upon the upper side of the board and at each side the said slot metal bars G, which are firmly secured to the board, thus forming a T-shaped longitudinal slot in the body.

Corresponding-shaped bolts H (one or more) extend from the movable seat D down through the slot E, the head of the bolt being beneath the bars G G, so as to take a bearing upon the under side, and thus clamp the seat to the body; but the clamping is only so firm as to hold the seat, yet permit it to slide longitudinally on the body.

To prevent the rattling which might occur between the movable seat and the body or the bolts in the slot, a longitudinal feather-spring I is arranged in the slot so as to bear upon the under side of the bars G G, as seen in Figs. 5 and 6, the bolts passing through this spring, and so as to bear thereon to hold the spring against the under side of the bars. This produces a yielding pressure between the seat and body, but which is sufficiently firm to hold the seat, yet by its resistance prevents rattling between the seat and body or between the bolts and the bars, which would naturally occur were no such resistance provided.

For convenience, a handle J is attached to the movable seat at the rear, by which it may be moved backward or forward. Thus arranged the movable seat may be drawn rearward from beneath the principal seat to an extreme rear position, as seen in Fig. 1, thus providing two seats, both facing forward. In this case a back K is hinged by arms L to the movable seat midway of the width of the seat, and as at M, Fig. 1, and so that the back may be turned up when the seat is drawn backward, as seen in Fig. 1, or when the back is not required, or when the movable seat is to be returned beneath the stationary seat, the back is turned forward so as to drop in front of the seat, as represented in Fig. 2.

If the movable seat is only desired for a rear-facing seat, it may be drawn from beneath the stationary seat, as represented in broken lines, Fig. 2, only so far as to present the seat, so that the back of the stationary seat may serve also as the back for the movable seat.

In some cases it is desirable that the wagons shall be normally provided with two seats, but be convertible to three seats. In such case the seat D is constructed as an extension from the rear seat, as seen in Fig. 7, and so that when the seat D normally stands beneath the principal or stationary seat the rear seat stands close up to the stationary seat, and so that a single back serves for both seats, the rear seat facing rearward; but when the movable seat is drawn rearward, as for three seats, as seen in Fig. 8, then the extension or seat D faces the stationary seat, while the rear seat still remains a rear-facing seat. In this case a suitable back is provided between the two movable seats, as seen in Fig. 8.

The attachment and disposition of the movable seat beneath the stationary seat is the same in either case.

I do not claim, broadly, a carriage in which the rear seat may be moved forward, and so that when forward it may be raised in a position under the forward seat, as such I am aware, broadly considered, is not new.

I claim—

1. In a buckboard wagon, the combination of a stationary box-seat on the body, forming a chamber beneath the seat, the said chamber open rearward, longitudinal guides on the body in rear of said stationary seat and extending into the bottom of said chamber, and a second box-shaped seat arranged on said guides on the body, and so as to slide on said guides from the body in rear of said stationary seat into the chamber beneath said stationary seat or be drawn rearward on said guides to form a seat in rear of said stationary seat, substantially as described.

2. In a buckboard wagon, the combination of a stationary seat forming a chamber beneath it, a longitudinal slot in the body, and a movable seat connected to the body through said longitudinal slot and adapted to slide backward and forward from or into said chamber beneath the said stationary seat, substantially as described.

3. In a buckboard wagon, the combination of a stationary seat on the body, forming a chamber beneath it, a longitudinal T-shaped slot in the body, a seat arranged upon the body over said slot, movable backward and forward from or into said chamber beneath the stationary seat, and a spring arranged beneath said slot so as to take a bearing at each side thereof, with connection from said seat through said slot and through said spring, substantially as and for the purpose described.

4. In a buckboard wagon, the combination of a stationary seat forming a chamber beneath it open at the rear, a movable box-shaped seat arranged on the body, longitudinally guided, and adapted to enter or move from said chamber through the rear, and a back for said second seat, centrally hung and adapted to throw down forward of said second seat, substantially as described.

GEORGE E. SPARE.

Witnesses:
FRED. C. EARLE,
LILLIAN D. KELSEY.